United States Patent [19]

Barsky

[11] Patent Number: 5,352,869
[45] Date of Patent: Oct. 4, 1994

[54] HEATABLE TRANSPARENT PANEL STRUCTURE UTILIZING THERMAL PROBE HAVING RESILIENTLY BIASED TEMPERATURE SENSOR

[75] Inventor: Barry E. Barsky, Huntingdon Valley, Pa.

[73] Assignee: Air-Shields, Inc., Hatboro, Pa.

[21] Appl. No.: 192,977

[22] Filed: Feb. 8, 1994

Related U.S. Application Data

[62] Division of Ser. No. 847,787, Mar. 6, 1992, Pat. No. 5,285,054.

[51] Int. Cl.$^5$ .................. A61G 11/00; H05B 3/34; G01K 1/14
[52] U.S. Cl. .................... 219/543; 219/522; 374/208; 338/22 R
[58] Field of Search .............. 219/543, 522, 203; 374/208; 338/22 R, 24

[56] References Cited

U.S. PATENT DOCUMENTS

| | | | |
|---|---|---|---|
| 2,358,081 | 9/1944 | Marick | 392/438 |
| 2,418,557 | 4/1947 | Reiser | 338/22 R |
| 2,535,393 | 12/1950 | Daugert | 392/438 |
| 2,579,964 | 12/1951 | Reynolds | 392/438 |
| 2,866,881 | 12/1958 | McMillen | 219/203 |
| 3,020,376 | 2/1962 | Hofmann et al. | 219/543 |
| 3,180,781 | 4/1965 | Ryan et al. | 219/203 |
| 3,299,253 | 1/1967 | Lawson, Jr. | 219/385 |
| 3,655,545 | 4/1972 | Gillery et al. | 204/192 |
| 3,718,535 | 2/1973 | Armstrong et al. | 219/203 |
| 3,858,570 | 1/1975 | Beld et al. | |
| 3,878,361 | 4/1975 | Levin et al. | 219/522 |
| 3,898,427 | 8/1975 | Levin et al. | 219/522 |
| 3,974,359 | 8/1976 | Orcutt et al. | 219/522 |
| 3,976,854 | 8/1976 | Ishikawa et al. | 219/505 |
| 3,996,447 | 12/1976 | Bouffard et al. | 338/22 R |
| 4,034,740 | 7/1977 | Atherton et al. | 236/3 |
| 4,242,567 | 12/1980 | Carter | 338/22 R |
| 4,410,790 | 10/1983 | Berg et al. | 219/203 |
| 4,419,023 | 12/1983 | Hager, Jr. | 374/208 |
| 4,459,470 | 7/1984 | Shlichta et al. | 219/203 |
| 4,707,586 | 11/1987 | Voss et al. | 219/203 |
| 4,743,741 | 5/1988 | Ramus | 219/203 |
| 4,820,902 | 4/1989 | Gillery | 219/203 |
| 5,119,467 | 6/1992 | Barsky et al. | 392/439 |
| 5,285,054 | 2/1994 | Barsky | 219/543 |
| 5,285,519 | 2/1994 | Barsky et al. | 392/439 |

Primary Examiner—Bruce A. Reynolds
Assistant Examiner—John A. Jeffery
Attorney, Agent, or Firm—Ratner & Prestia

[57] ABSTRACT

A thermal probe for measuring and controlling the temperature of a transparent, multi-panel assembly in which one of the panels has an electrically conductive coating which serves as a radiant heat source. A sensor, urged against the panel having the coating, senses the temperature of this panel and controls a power source which powers the coating. A compressible spacing member, fitted between the sensor and the other transparent panel, urges the sensor into proximity with the panel being measured and controlled.

4 Claims, 2 Drawing Sheets

HEATABLE TRANSPARENT PANEL STRUCTURE UTILIZING THERMAL PROBE HAVING RESILIENTLY BIASED TEMPERATURE SENSOR

This application is a division of application Ser. No. 07/847,787, filed Mar. 6, 1992, now U.S. Pat. No. 5,285,054.

BACKGROUND OF THE INVENTION

The present invention relates, in general, to sensing and controlling the temperature of multi-panel heated assemblies and, in particular, to a thermal probe for sensing the temperature of one panel of an optically transparent, multi-panel assembly which has a radiant heater and by which radiation losses, such as those by an infant in an infant incubator, are reduced.

Infant incubators are used in the treatment and maintenance of weak, sickly, premature or low birth weight infants in order to maintain infant body temperature and allow the infant to develop. Infants may lose heat in four ways: through evaporation, convection, conduction and radiation. Conductive heat loss in an infant is usually considered negligible, since the mattress upon which the infant is placed is generally an excellent insulator and, therefore, such net heat loss is small. Evaporative heat loss is dependent upon the incubator air temperature and infant skin temperature differential, as well as the relative humidity of the incubator air and the air velocity across the infant's skin. Evaporative heat loss is often referred to as insensible water loss and can be controlled by controlling the air flow characteristics of the incubator design, the incubator air temperature, and by adding humidity to the incubator air. Convective heat loss is also a function of the incubator air temperature and infant skin temperature differential. Radiative or radiant heat loss is a function of infant skin temperature and incubator wall temperature differential. Radiant heat loss is typically the major source of heat loss, except in the very first days in the life of a very premature, very low birth weight infant, when evaporative heat loss (insensible water loss) may be greater.

The amount of heat loss by any of the ways mentioned is dependent upon incubator design and the metabolism of the infant. The desired objective of an incubator environmental control system is to provide a thermal environment which will place minimum demand on the metabolism of the infant to maintain body temperature at the preferred level. Typically, this state of minimum metabolic demand is assumed to be achieved when the skin temperature of an infant is maintained within a prescribed normal range.

Radiant heat loss from the infant may be reduced by minimizing radiant heat loss through the walls of the incubator. This is because the primary source of radiant heat loss in an incubator is cold incubator walls. One approach for minimizing radiant heat loss is to increase the wall temperature of the incubator, thereby minimizing the temperature differential between the infant and the incubator walls.

In copending application Ser. No. 07/561,893 filed Aug. 2, 1990 and entitled TRANSPARENT FILM RADIANT HEAT SOURCE FOR USE WITH INCUBATORS, now U.S. Pat. No. 5,119,467 and in copending application Ser. No. 07/847,926 filed concurrently herewith and also entitled TRANSPARENT FILM RADIANT HEAT SOURCE FOR USE WITH INCUBATORS, now U.S. Pat. No. 5,285,519, both assigned to the same assignee as the assignee of this application, a transparent radiant film is applied to one panel of a multi-panel assembly, either in the form of an incubator hood or an overlay for an incubator hood. The radiant film, when powered, raises the temperature of the incubator hood, thereby reducing radiant heat losses, and also can provide radiant heat which affects the air temperature within the incubator hood.

In using such radiant heaters, it is important to accurately control the temperature of the incubator walls. This, in turn, requires proper and accurate sensing of the wall temperature of the incubator hood.

SUMMARY OF THE INVENTION

An optically transparent, multi-panel assembly, constructed in accordance with the present invention, includes first and second rigid, optionally transparent panels, the second panel having an optically transparent, electrically conductive coating on a surface thereof and to which electrical power is supplied. Also included in this assembly is a strip of dielectric material having conductive traces embedded therein adapted for connection to a utilization circuit. The strip of dielectric material has a first surface bearing against the optically transparent, electrical coating on the second rigid, optically transparent, panel. This optically transparent, multi-panel assembly further includes sensing means electrically connected to the conductive traces embedded in the strip of dielectric material and disposed at a second surface of the strip of dielectric material opposite from the first material of the strip of dielectric material for developing signals representative of the temperature of the second rigid, optically transparent, panel. These signals are supplied to circuit means connected to the conductive traces embedded in the strip of dielectric material for controlling the electrical power supplied to the optically transparent, electrically conductive coating. Also included in the inventive optically transparent, multi-panel assembly is a resilient spacing member having a first end bearing against the sensing means and compressible along its length and having a length in its uncompressed state which urges the sensing means into proximity with the second rigid, optically transparent, panel when the resilient spacing member, the dielectric material and the sensing means are placed between the first and the second rigid, optically transparent, panels. Finally, an optically transparent, multi-panel assembly, constructed in accordance with the present invention, includes a radiation reflector at a second end of the resilient spacing member opposite from the first end of the resilient spacing member and bearing against the first rigid, optically transparent, panel. In one application of the present invention, the first and second rigid, optically transparent panels are sheet sections of a radiant heat source overlay for an infant incubator.

DETAILED DESCRIPTION OF THE INVENTION

Figure 1:
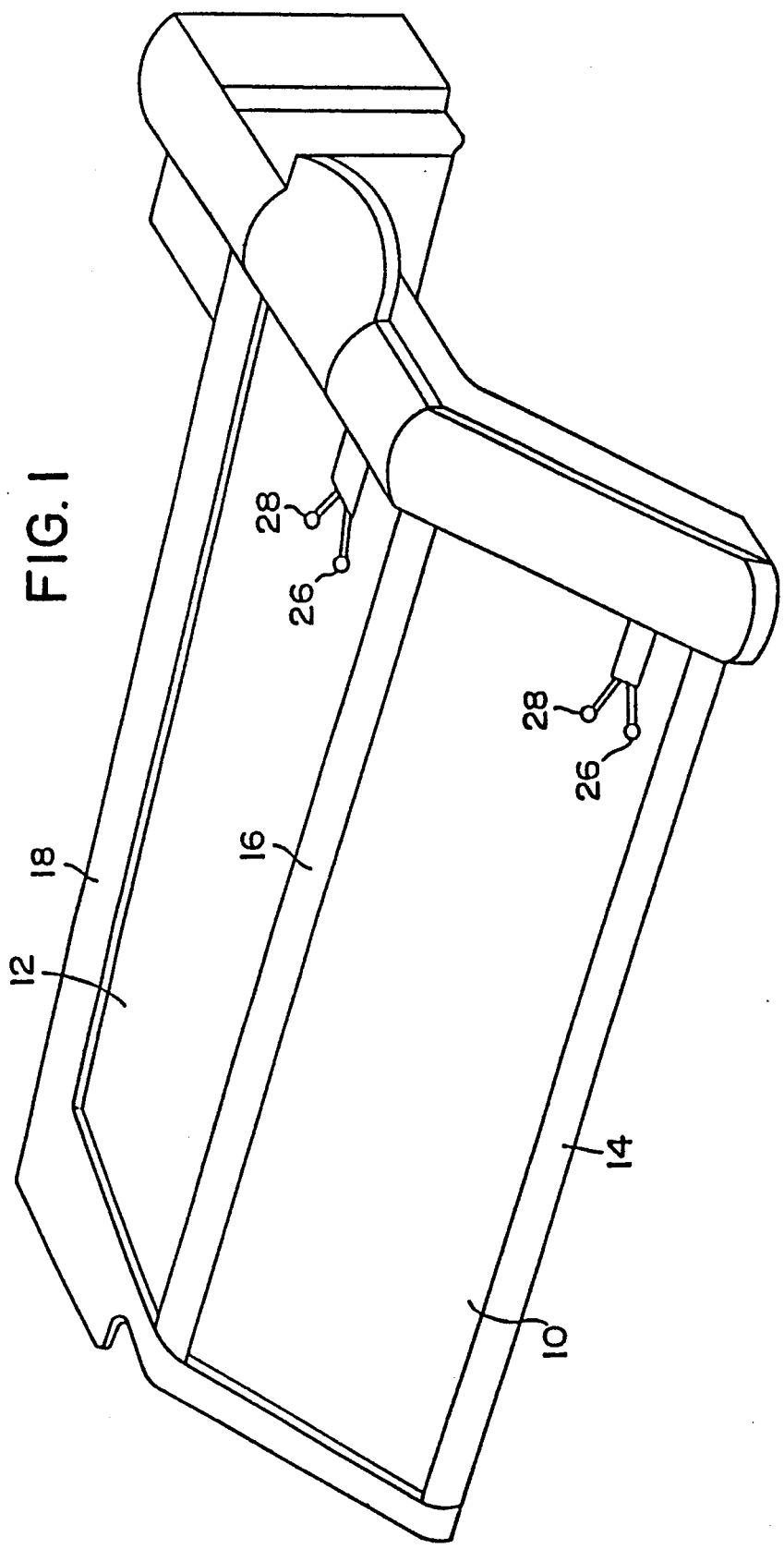
FIG. 1 is a perspective view of an overlay for an incubator hood with which a thermal probe, constructed in accordance with the present invention, can be used.
Figure 3:
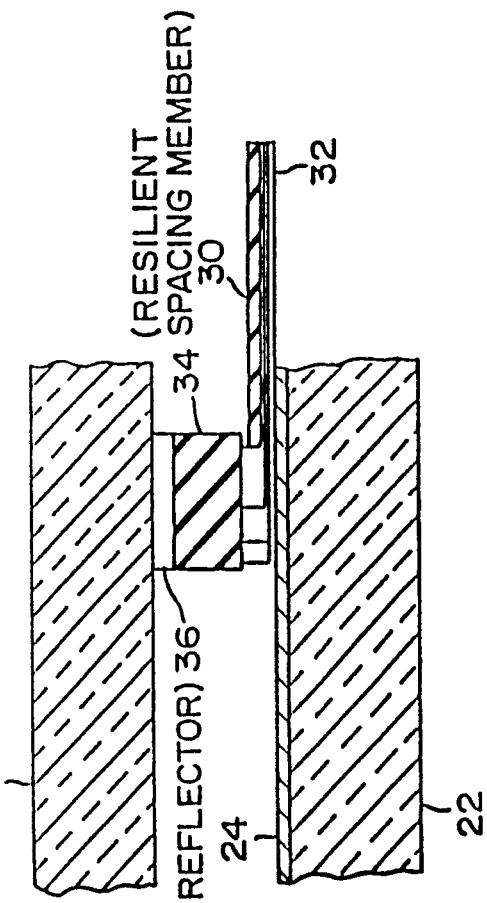
FIG. 3 is a side view of a portion of the FIG. 2 thermal probe in place in a multi-panel, optically transparent assembly in accordance with the present invention.

FIG. 1, which illustrates an overlay for an incubator hood with which a thermal probe, constructed in accordance with the present invention, can be used, is but one example of an optically transparent, multi-panel assembly constructed in accordance with the present invention. This incubator hood overlay includes an inclined section 10, a horizontal section 12 and a plurality of longitudinal ribs 14, 16 and 18 for holding sections 10 and 12 in a fixed relationship to one another. Each of the two sections 10 and 12 of the incubator hood overlay has first and second rigid, optically transparent plastic panels 20 and 22, respectively, as shown in FIG. 3, with the panels spaced apart to form an air gap and lower panel 22 having an optically transparent, electrically conductive coating 24. Coating 24 functions as a source of radiant heat when electrical power is conducted to the coating. As such, coating 24 heats lower panel 22 which, in turn, heats the incubator hood on which the overlay is placed to reduce radiant heat losses. In addition, coating 24 also can provide heat to the interior of the incubator hood to heat the air inside the incubator hood. For more of the details about the construction and operation of such an overlay, reference should be made to the aforesaid copending application Ser. No. 07/561,893 filed Aug. 2, 1990 and entitled TRANSPARENT FILM RADIANT HEAT SOURCE FOR USE WITH INCUBATORS, now U.S. Pat. No. 5,119,467, and to the aforesaid copending application Ser. No. 07/847,926 filed concurrently herewith and also entitled TRANSPARENT FILM RADIANT HEAT SOURCE FOR USE WITH INCUBATORS, now U.S. Pat. No. 5,285,519.

Figure 2:
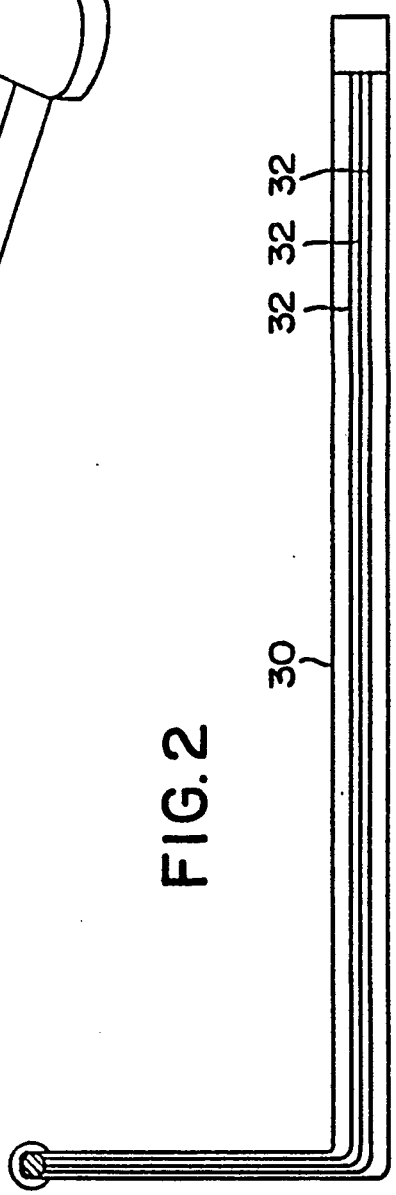
FIG. 2 is a top view of a preferred embodiment of thermal probe constructed in accordance with the present invention.
Figure 4:
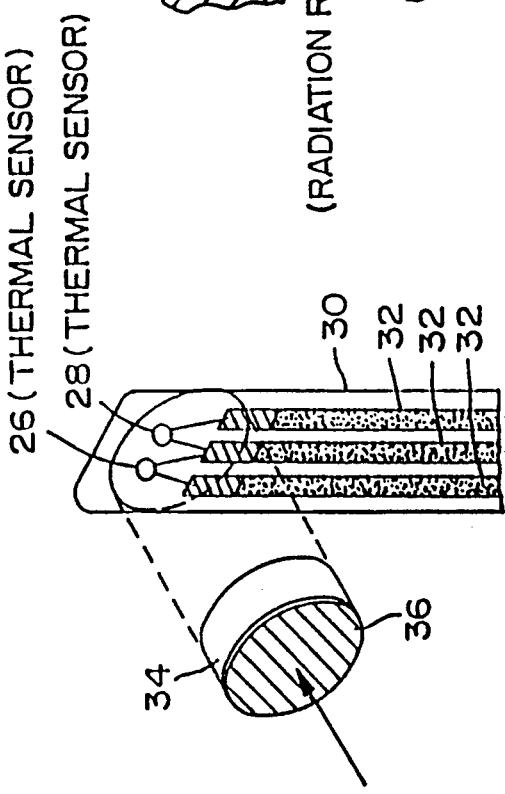
FIG. 4 is, in part, an exploded perspective view of a portion of the FIG. 2 thermal probe and, in part, a block diagram of the circuitry for controlling the heating of a multi-panel, optically transparent assembly with which the thermal probe is used.

FIGS. 2, 3 and 4 illustrate a first preferred embodiment of a thermal probe, constructed in accordance with the present invention, which can be used to sense and control the temperature of an optically transparent, multi-panel assembly such as the overlay illustrated in FIG. 1. This thermal probe includes sensing means for developing signals representative of the temperature of one of the panels, namely lower panel 22 of the multi-panel assembly. For the embodiment of the invention being described and illustrated, the sensing means include a pair of thermal sensors 26 and 28. "Bead type" thermistors, such as the ones supplied by Thermametrics, can serve as sensors 26 and 28. The reason why two sensors are included will be explained hereinafter.

A thermal probe, constructed in accordance with the present invention, also includes means electrically connected to thermal sensors 26 and 28 for conducting signals developed by the sensors to a utilization circuit. Such signal conducting means include, for the embodiment of the invention being described and illustrated, a strip of dielectric material 30 having conductive traces 32 embedded in the dielectric strip which are connected to the utilization circuit as shown in FIG. 4. One surface of the dielectric strip 30 is adapted to bear against the panel of the multi-panel assembly which is to have its temperature controlled, namely lower panel 22. As shown most clearly in FIG. 3, dielectric strip 30 is positioned to bear against conductive coating 24 which is located between panels 20 and 22 to protect the coating which is fragile and subject to abrasion and electrical discontinuity caused by abrasion. The dielectric strip will not cause abrasion.

Sensors 26 and 28 are disposed at a second surface of dielectric strip 30 opposite from that surface of the dielectric strip which bears against coating 24. In this way, sensors 26 and 28 are spaced from coating 24 so that they will not damage the coating but are in proximity to lower panel 22 to sense the temperature of this panel.

For the embodiment of the invention being described and illustrated, dielectric strip 30 is L-shaped. Sensors 26 and 28 are at the free end of the short leg 30a of the L-shaped strip of dielectric material and the free end of the long leg 30b of the L-shaped dielectric strip is adapted for connection to the utilization circuit. The shape and dimensions of dielectric strip 30 are selected for proper insertion and positioning of the sensing means and to accommodate the construction of the incubator hood overlay of FIG. 1. For other applications, the dielectric strip would be shaped differently.

As indicated previously, in certain uses of radiant heaters, such as in conjunction with infant incubators, it is important to accurately control the temperature of the incubator walls. This, in turn, requires proper and accurate sensing of the wall temperature of the incubator hood. Accordingly, a thermal probe, constructed in accordance with the present invention, further includes a resilient spacing member 34 which is compressible along its length and has a length in its uncompressed state which urges sensors 26 and 28 against coating 24 when spacing member 34 and dielectric strip 30, with sensors 26 and 28, are placed between panel 20 and coating 24. Resilient spacing member 34 overlies sensors 26 and 28 and preferably is adhesively attached to dielectric strip 30.

Besides urging sensors 26 and 28 into proximity with panel 22, so that accurate measurements of the temperature of panel 22 will be made, resilient spacing member 34 also inhibits the assembly at the end of the dielectric strip from sliding between the panels. Referring to FIG. 1, typically, the equipment (i.e. the incubator and the overlay) is set up so that a certain temperature (e.g. 41° C.) will be produced at the center of the incubator hood. The sensing means are not located at this point because they would obstruct viewing of an infant in the incubator. Instead, the sensing means are off to one side as illustrated in FIG. 1. The equipment, however, is calibrated to take into account the spacing of the sensing means from the center of the incubator hood. To the extent that the sensing means are not at the prescribed position, the effect of the radiant heat produced by the incubator hood overlay on the temperature at the center of the incubator hood will be incorrect.

A thermal probe, constructed in accordance with the present invention, preferably also includes a radiation reflector 36 at the end of resilient spacing member 34 opposite from the end which bears against sensors 26 and 28. Radiation reflector 36 bears against upper panel 20 and is provided to minimize, if not eliminate entirely, the effect of ambient thermal radiation on the sensing means.

The sensing means and the utilization circuit of the embodiment of the present invention which is being described and illustrated are arranged to sense and control the temperature of panel 22 and also to alarm and cut off power when a particular temperature of panel 22 is exceeded. This is the reason why there are two sensors and three conductive traces with one of the conductive traces being a common conductor. Accordingly, the signals developed by sensors 26 and 28, each being representative of the temperature of panel 22 at the point where the sensors are located, are supplied to a pair of comparators 38 and 40. Comparator 38 also receives a set temperature signal which corresponds to the desired temperature of panel 22. Comparator 38 controls a power source 42 which supplies power to conductive coating 24 according to the difference between the signal from sensor 26 and the set temperature signal.

Comparator 40 also receives an alarm temperature signal which corresponds to the maximum desired temperature of panel 22. If the alarm temperature is exceeded by the measured temperature of panel 22, comparator 40 effects entire cut-off of power supplied by power source 42.

Figure 5:
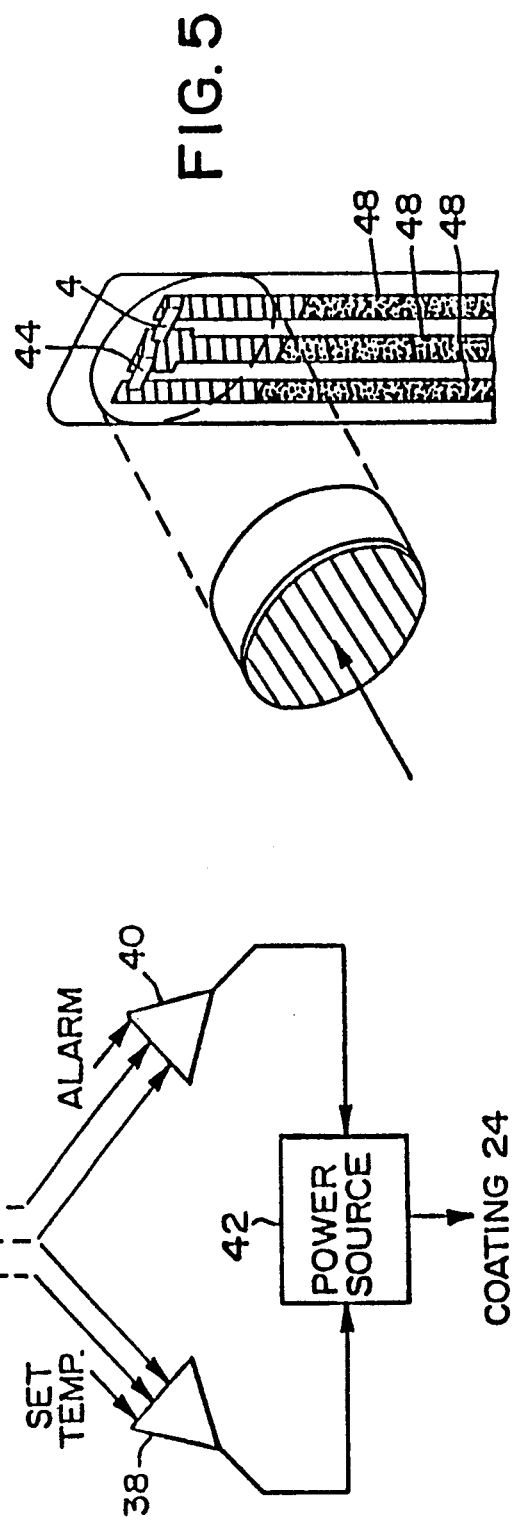
FIG. 5 is an exploded perspective view of an alternative sensor arrangement for a thermal probe constructed in accordance with the present invention.

FIG. 5 shows an alternative sensor arrangement for a thermal probe constructed in accordance with the present invention. The sensor arrangement shown in FIG. 5 differs from the sensor arrangement shown in FIG. 4 by the use of surface mount thermistors 44 and 46, such as those supplied by Dale, instead of bead type thermistors 26 and 28, and the special configuration of the ends of conductive traces 48 by which the surface mount thermistors are connected between the conductive traces. Otherwise, the sensor arrangement of FIG. 5 is identical to and functions as the sensor arrangement of FIG. 4.

It is understood that various other modifications will be apparent to and can be readily made by those skilled in the art without departing from the spirit and scope of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed:

1. An optically transparent, multi-panel assembly comprising:
   a first rigid, optically transparent panel;
   a second rigid, optically transparent panel having an optically transparent, electrically conductive coating on a surface thereof and to which electrical power is supplied;
   a strip of dielectric material having conductive traces embedded therein adapted for connection to a utilization circuit, said strip of dielectric material having a first surface bearing against said optically transparent, electrically conductive coating on said second rigid, optically transparent, panel;
   sensing means electrically connected to said conductive traces embedded in said strip of dielectric material and disposed at a second surface of said strip of dielectric material opposite from said first surface of said strip of dielectric material for developing signals representative of the temperature of said second rigid, optically transparent, panel;
   a resilient spacing member having a first end bearing against said sensing means and compressible along its length and having a length in its uncompressed state which urges said sensing means into proximity with said second rigid, optically transparent, panel when said resilient spacing member, said dielectric material and said sensing means are placed between said first and said second rigid, optically transparent, panels;
   and a radiation reflector at a second end of said resilient spacing member opposite from said first end of said resilient spacing member and bearing against said first rigid, optically transparent, panel.

2. A temperature controlled, optically transparent, multi-panel assembly comprising:
   a first rigid, optically transparent panel;
   a second rigid, optically transparent panel having an optically transparent, electrically conductive coating on a surface thereof;
   a strip of dielectric material having conductive traces embedded therein and having a first surface bearing against said optically transparent, electrically conductive coating on said second rigid, optically transparent, panel;
   sensing means electrically connected to said conductive traces embedded in said strip of dielectric material and disposed at a second surface of said strip of dielectric material opposite from said first surface of said strip of dielectric material for developing signals representative of the temperature of said second rigid, optically transparent, panel;
   a resilient spacing member having a first end bearing against said sensing means and compressible along its length and having a length in its uncompressed state which urges said sensing means into proximity with said second rigid, optically transparent, panel when said resilient spacing member, said dielectric material and said sensing means are placed between said first and said second rigid, optically transparent, panels;
   a radiation reflector at a second end of said resilient spacing member opposite from said first end of said resilient spacing member and bearing against said first rigid, optically transparent, plastic panel;
   a source of electrical power connected to said optically transparent, electrically conductive coating;
   and circuit means electrically connected to said conductive traces embedded in said strip of dielectric material and responsive to said signals developed by said sensing means for controlling the electrical power supplied by said source of electrical power to said optically transparent, electrically conductive coating.

3. A temperature controlled, optically transparent, multi-panel assembly according to claim 2 further including:
   (a) means for supplying a set temperature signal corresponding to the desired temperature of said second rigid, optically transparent, panel, and
   (b) means for supplying an alarm temperature signal corresponding to a maximum desired temperature of said second rigid, optically transparent, panel, and
   wherein:
   (a) said sensing means include first and second thermistors, each developing a signal representative of the temperature of said second rigid, optically transparent, panel and
   (b) said circuit means include:

(i) a first comparator responsive to said signal developed by said first thermistor and said set temperature signal for regulating the amount of power supplied by said source of electrical energy according to the difference between said signal developed by said first thermistor and said set temperature signal, and (ii) a second comparator responsive to said signal developed by said second thermistor and said alarm temperature signal for cutting off power supplied by said source of electrical energy when said signal developed by said second thermistor exceeds said alarm temperature signal.

4. A radiant heat source overlay for an infant incubator comprising:

a plurality of rigid, transparent sheet sections joined together into a shape adapted to rest on an incubator hood, each of said sections having upper and lower transparent sheets which are spaced apart to form an air gap and an optically transparent, electrically conductive coating on each said lower transparent sheet;

a strip of dielectric material having conductive traces embedded therein and having a first surface bearing against said optically transparent, electrically conductive coating on said lower transparent sheet;

sensing means electrically connected to said conductive traces embedded in said strip of dielectric material and disposed at a second surface of said strip of dielectric material opposite from said first surface of said strip of dielectric material for developing signals representative of the temperature of said lower transparent sheet;

a resilient spacing member having a first end bearing against said sensing means and compressible along its length and having a length in its uncompressed state which urges said sensing means into proximity with said lower transparent sheet when said resilient spacing member, said dielectric material and said sensing means are placed between said upper and said lower transparent sheets;

a radiation reflector at a second end of said resilient spacing member opposite from said first end of said resilient spacing member and bearing against said upper transparent sheet;

a source of electrical power connected to said optically transparent, electrically conductive coating;

and circuit means electrically connected to said conductive traces embedded in said strip of dielectric material and responsive to said signals developed by said sensing means for controlling the electrical power supplied by said source of electrical power to said optically transparent, electrically conductive coating.

* * * * *